United States Patent [19]

Kobari

[11] Patent Number: 4,898,635
[45] Date of Patent: Feb. 6, 1990

[54] METHOD AND APPARATUS FOR BONDING PARTS OF DISAPPEARING MODEL USED FOR CASTING

[75] Inventor: Toshiaki Kobari, Nagano, Japan

[73] Assignee: Morikawa Sangyo Kabushiki Kaisha, Nagano, Japan

[21] Appl. No.: 256,485

[22] Filed: Oct. 12, 1988

[30] Foreign Application Priority Data

Oct. 31, 1987 [JP] Japan .................. 62-276854

[51] Int. Cl.$^4$ .................. B29C 45/14; B32B 31/14
[52] U.S. Cl. .................. 156/245; 156/305;
156/500; 164/34; 164/45; 164/246; 264/328.1;
264/328.9; 249/83
[58] Field of Search ............... 156/245, 304.1, 304.5,
156/94, 500, 294, 546, 547, 556, 305; 249/83;
164/9, 34, 35, 45, 246, 247, 96; 264/328.1,
328.9; 425/108; 29/402.18, 464, 530

[56] References Cited

U.S. PATENT DOCUMENTS

| 3,847,694 | 11/1974 | Stewing | 156/305 |
| 3,902,949 | 6/1975 | Norman | 156/305 |
| 4,572,762 | 2/1986 | Winston | 156/556 |
| 4,640,728 | 2/1987 | Martin et al. | 156/245 |
| 4,732,204 | 3/1988 | Tabardin | 164/45 |
| 4,790,367 | 12/1988 | Moll | 164/34 |

Primary Examiner—Caleb Weston
Attorney, Agent, or Firm—Price, Heneveld, Cooper, DeWitt & Litton

[57] ABSTRACT

A method and an apparatus for bonding parts of a disappearing model used for casting. This method comprises placing portions of parts of a disappearing model to be bonded so as to oppose each other to form portions to be adhered, surrounding the portions to be adhered by an injection mold frame which is previously formed, has an internal shape that accords with the external shape of the portions to be adhered and comprises a receiving mold and an injection mold that has an injection hole formed therein to allow an adhesive to be injected, and injecting the adhesive into the portions to be adhered from the injection hole.

3 Claims, 5 Drawing Sheets

METHOD AND APPARATUS FOR BONDING PARTS OF DISAPPEARING MODEL USED FOR CASTING

BACKGROUND OF THE INVENTION

1. Field of the Invention

The present invention relates to a method and apparatus for bonding parts of a disappearing model used for casting, and particularly to a method and apparatus for bonding parts of a disappearing model in a casting method which uses a disappearing model.

2. Related Art Statement

In conventional casting methods of the type that use a disappearing model, the disappearing model is generally made of foamable synthetic resin, particularly foamable polystyrol, and is formed as one unit. However, a disappearing model having a complicated shape is formed by forming parts of the disappearing model in advance, which parts have shapes obtained by dividing the model, and then bonding them together with an adhesive to form a unit. This bonding is performed by applying an adhesive in advance on the surface of each of portions of two parts of a disappearing model to be bonded, using a brush or the like and then bringing these portions into contact with each other.

The adhesive used in this bonding process may be an ordinary adhesive such as a synthetic resin adhesive of the type in which a solvent volatilizes, or one of the type in which a hardener is mixed, or again a synthetic rubber adhesive, but a hot melt-type adhesive is the type most preferably used. Such hot melt-type adhesives are solid at room temperature but may be softened by heating to about 100° C. and sufficiently melted at about 130° C. to 180° C. or 190° C. to 210° C. to assume a liquid form which can be easily applied. When such a liquid adhesive is used for bonding, the adhesive hardens immediately after bonding whereby the adhered portions become tightly bonded because the temperature thereof returns to room temperature. Various types of hot melt-type adhesive are commercially available at present. Since the compositions of these adhesives are already known, no detailed description thereof will be given here.

However, when the bonding is performed by using an adhesive as described above, an inevitable problem occurs in that the adhesive held between the portions to be adhered of the above-described two parts of a disappearing model is extruded outwardly to form a projection having a strip-like form. If the thus-formed disappearing model is used in casting, the above-described projection will be faithfully reproduced in the surface of the cast product to form a strip projecting from the surface thereof. Since the removal of such a projecting strip requires much labor and a process suitable for the purpose, extra time and expense will be involved. When such a projecting strip is formed on a portion having a complicated shape, it is in some cases difficult to apply the tool used in removing the strip and to remove it.

In order to eliminate the above-described problem, an insufficient amount of adhesive may, for example, be applied to one of the surfaces of the portions to be adhered of two disappearing model parts to be bonded so that no projection of the above-described type is produced, and the portions to be adhered together are then brought into contact with each other. In this case, portions near the margins of the surfaces to be adhered sometimes lack the adhesive and thus each have a concave cross-sectional form which results in the production of concave-shaped strips. If the thus-formed disappearing model is used in casting, such concave-shaped strips would also be reproduced faithfully in the surface of a cast product and will thus result in concave-shaped strips on the surface of the cast product. Such concave-shaped strips cause the strength of the cast product to be reduced, as well as making the appearance of the product poor, resulting in inferior products.

The present invention has been achieved with a view to solving the aforementioned problem in the production of disappearing models used for casting, and it is an object of the present invention to provide a method and apparatus for bonding parts of a disappearing model used for casting which is capable of eliminating the production of any projection formed by an adhesive and having the form of a strip on the outside of portions of the disappearing models to be adhered, as well as eliminating portions thereof which lack the adhesive and thus have a concave cross-sectional form.

SUMMARY OF THE INVENTION

The present invention provides a method of bonding parts of a disappearing model used for casting characterized by placing portions of a plurality of parts of the disappearing model to be bonded adjacent to each other to form the portions to be adhered, surrounding the portions to be adhered with an injection mold frame which is formed in advance to have an internal shape that accords with the external shape of the portions to be adhered and comprises a receiving mold and an injection mold having an injection hole formed therein to allow an adhesive to be injected, injecting the adhesive between the two adhesive portions so as to bond them to each other, and removing the injection mold frame from the portions to be adhered.

The adhesive used in this method of bonding parts of a disappearing model used for casting is a hot melt-type adhesive.

The present invention also provides an apparatus for bonding parts of a disappearing model used for casting comprising an injection mold frame having a receiving mold and an injection mold which has an internal shape that accords with the external shape of portions to be bonded together; an injection hole which is formed in the injection mold to allow the adhesive to be injected therethrough; and an apparatus for injecting the adhesive into the injection hole.

The injection mold and the receiving mold of the apparatus for bonding parts of a disappearing model used for casting are so formed as to be movable in opposite directions relative to each other by means of a driving apparatus.

In the apparatus of the present invention, a jet nozzle for the adhesive of the injection apparatus is fixed to the injection mold, and the adhesive injecting apparatus is an apparatus for injecting a hot melt-type adhesive.

DETAILED DESCRIPTION OF PREFERRED EMBODIMENTS

Figure 1:
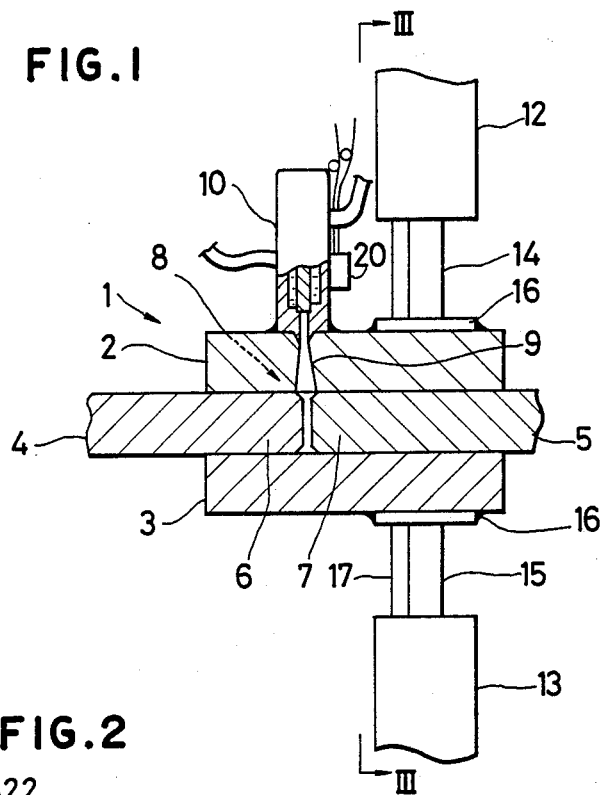
FIG. 1 is a partial sectional view of a bonding apparatus that utilizes a bonding method of the present invention, with part of the apparatus omitted.
Figure 2:
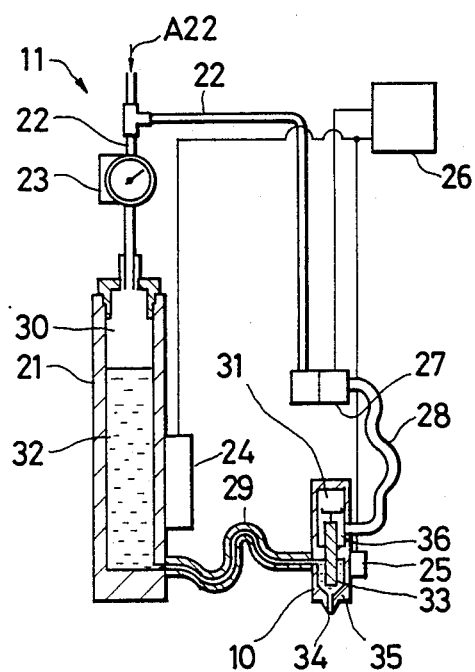
FIG. 2 is a partial sectional view of an adhesive injecting apparatus which is incorporated into the apparatus shown in FIG. 1.
Figure 3:
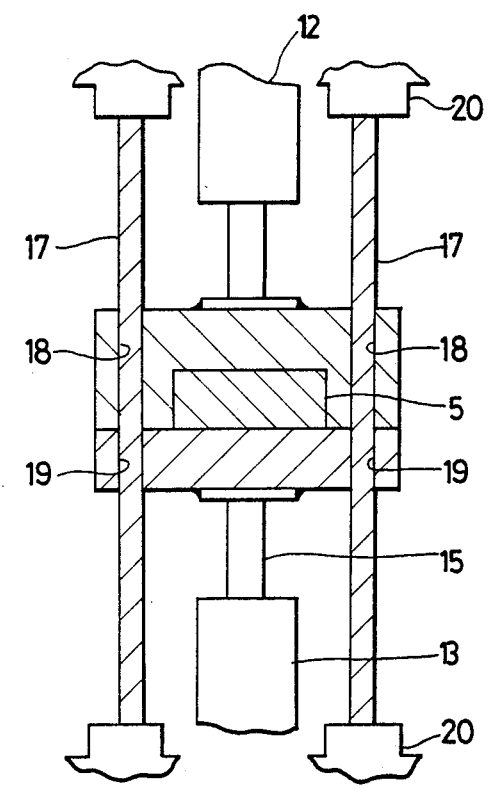
FIG. 3 is a sectional taken along the line III—III in FIG. 1.

In FIGS. 1 and 3, reference numeral 1 denotes an injection mold frame which comprises an injection mold 2 and a receiving mold 3 and which is so formed as to have an internal shape that accords with the external shape of a portion 8 comprising portions 6, 7 of the plurality of disappearing model parts 4, 5 to be adhered together plurality of disappearing model parts 4, 5. Reference numeral 9 denotes an injection hole for injecting an adhesive, and reference numeral 10 denotes a nozzle for jetting the adhesive of an adhesive injection apparatus 11 (shown in FIG. 2), the nozzle being fixed to the injection mold 2. Reference numerals 12, 13 respectively denote champing apparatuses for the injection mold 2 and the receiving mold 3. As an example, each of the clamping apparatuses 12, 13 uses an air cylinder provided with piston rods 14, 15 moved in opposite directions. Reference numeral 16 denotes fixed portions. Therefore, when the injection mold and the receiving mold 3 which are respectively fixed to the piston rods 14, 15 are moved in opposite directions, the injection mold frame 1 is opened or closed. An air pump is used to supply pressurized air to these air cylinders, or a controller may be utilized for the air cylinders, though these not shown in the drawings.

Each of the clamping apparatuses 12, 13 may consist of the above-described external hydraulic apparatus, or it may be a clamping apparatus (not shown in the drawing) such as an apparatus in which an eccentric shaft is provided in a rotary disc or in which a gear is engaged with a rack, all of which effect mechanical reciprocating motions. The present invention may include various known clamping apparatuses which effect reciprocating motions.

The clamping apparatuses 12, 13 are also controlled by a controller (not shown) so as to move simultaneously in opposite directions in one operation so as to have the injection mold frame 1 opened or closed.

Reference numeral 17 (in FIGS. 1 and 3) denotes a guide rod, reference numerals 18, 19 denote guide holes and reference numeral 20 denotes a frame for the apparatus.

FIG. 1 shows the state in which the portions 6, 7 to be adhered of the disappearing model parts 4, 5 are placed opposite to each other to form the portion 8 which is surrounded by the injection mold frame 1. In this state, the jet nozzle 10 is fixed to the injection mold 2.

Figure 4:
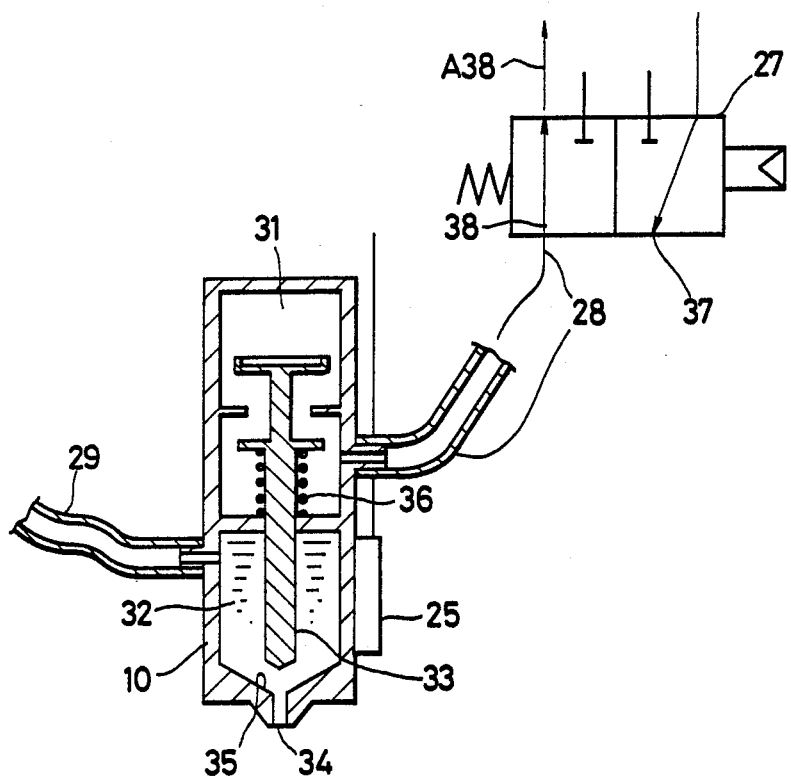
FIG. 4 is an enlarged detailed drawing of part of the apparatus shown in FIG. 2.
Figure 5:
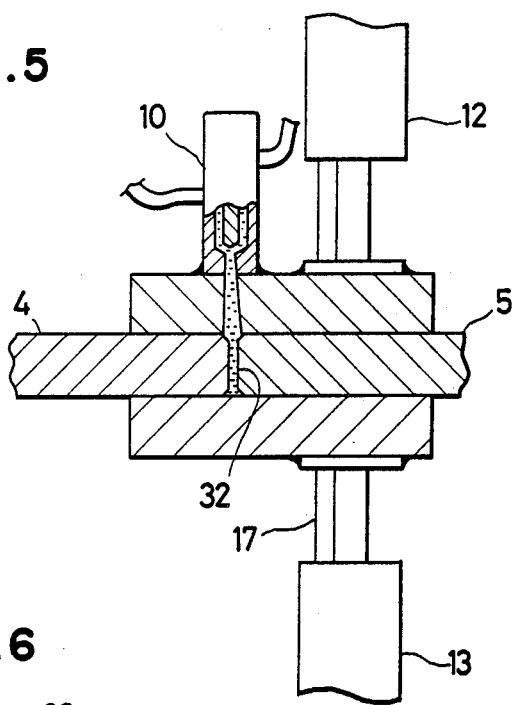
FIG. 5 illustrates the apparatus shown in FIG. 1 in a different phase of operation from that shown in FIG. 1.

In FIG. 2, reference numeral 11 denotes the above-described adhesive injecting apparatus, reference numeral 21 denotes a closed adhesive container and reference numeral 22 denotes a communicating tube which is connected to an air pump (not shown). Reference numeral 23 denotes a regulator; reference numerals 24, 25, heaters; reference numeral 26, a power source; reference numeral 27, an electromagnetic switch valve; reference numerals 28, 29, tubes made of elastic substances; reference numeral 30, a main pressurized chamber; reference numeral 31, a secondary pressurized chamber; and reference numeral 32, a hot melt-type adhesive. As shown in FIGS. 2 and 4, reference numeral 33 denotes a valve body; reference numeral 34, a nozzle; and reference numeral 35, a valve seat. The valve body 33 is constantly urged upward by a spring 36. When the electromagnetic switch valve 27 is opened to cause a pressure port 37 to communicate with the secondary pressurized chamber 31 of the jet nozzle 10, the pressure in the chamber 31 is increased and the nozzle 34 is closed by the valve body 33 against the force of the spring 36. When the electromagnetic valve 27 is closed to cause a pressure reduction port 38 to communicate with the secondary pressurized chamber 31, the pressurized air in the chamber 31 is released to the atmosphere from the pressure reduction port 38 as shown by an arrow A38. The valve body 33 is thus pushed upward by the spring 26, and the nozzle 34 is opened so that the hot melt-type adhesive 32 is jetted from the nozzle 34.

A description will now be made of the function of the adhesive injecting apparatus 11.

When pressurized air is sent to the main pressurized chamber 30 from the air pump (not shown) as shown by an arrow A22, the hot melt-type adhesive 32 is sent to the jet nozzle 10. In this case, the hot melt-type adhesive is previously melted by the heaters 24, 25, and the electromagnetic switch valve 27 is opened in advance. Thus, the pressurized air is sent to the secondary pressurized chamber 31 in advance so as to cause the nozzle 34 to be closed by the valve body 33. Then, when the electromagnetic switch valve 27 is closed, the valve body 33 is moved upward by the spring 36, as described above, and the hot melt-type adhesive 32 is sent to the portion 8 from the nozzle 34.

Figure 6:
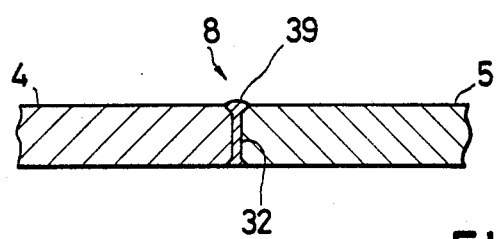
FIG. 6 is a sectional view of portions of the disappearing model that are bonded by the apparatus shown in FIG. 5.
Figure 7:
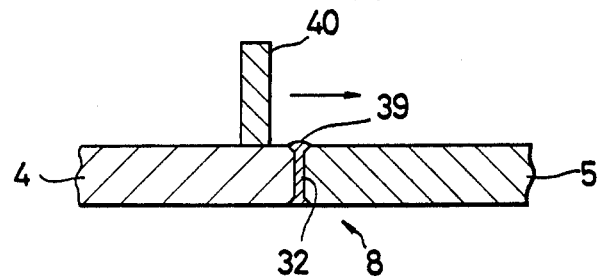
FIG. 7 is a drawing of a situation in which part of the disappearing model shown in FIG. 6 is corrected.

When the adhesive portion 8 is bonded in the above-described manner, the injection mold frame 1 is opened by operation of the clamping apparatuses 12, 13, and a disappearing model having the portion 8 bonded as shown in FIG. 6 is obtained. In this case, as shown by reference numeral 39 in FIG. 6, projections formed by the adhesive 32 are formed. However, since these projections are simply spot-like and generally do not become problems, the disappearing model obtained may be used for casting in this state. In cases where these projections become problems, they are scratched or sheared off by using a suitable tool 40 as shown in FIG. 7.

Figure 8:
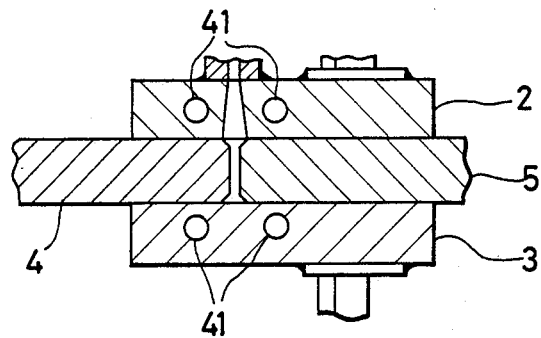
FIG. 8 is a partial section of another embodiment of the bonding apparatus of the present invention.
Figure 9:
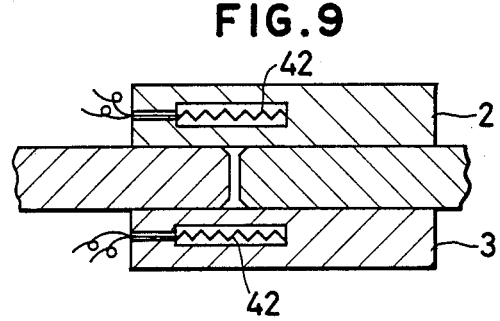
FIG. 9 is a drawing of a further embodiment of the present invention corresponding to FIG. 8.
Figure 10:
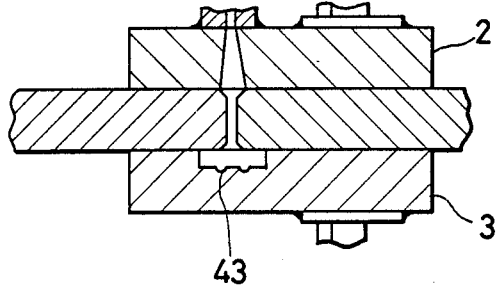
FIG. 10 is a drawing of a still further embodiment of the present invention corresponding to FIG. 8.

FIG. 8 shows another embodiment of the present invention in which refrigerant passages 41 may be formed in the injection mold 2 and the receiving mold 3 so that a refrigerant such as water can be forced therethrough. In the further embodiment shown in FIG. 9, heaters 42 may be provided in the injection mold 2 and the receiving mold 3. Alternatively, as shown in FIG. 10, a die portion 43 may be formed in the receiving mold 3 so that a mark, character or engagement projection is formed. Such a mark, character or engagement projection is formed by the hot melt-type adhesive 32 and is then reproduced on a casting product.

As described above, in the present invention, the portion to be adhered comprising a plurality of parts of a disappearing model is surrounded by the injection mold frame having an internal shape that accords with the external shape of the portion to be adhered, and the adhesive is injected into the portion to be adhered from the injection hole formed in the frame by means of the injection apparatus. Therefore, the present invention is capable of bonding the portion to be adhered without producing any projecting strip or concave-shaped strip by the adhesive, as described above, as well as of providing an apparatus which can perform the aforementioned bonding. The use of the hot melt-type adhesive enables the bonding to be effected in a very short time and thus effectively. In addition, since the injection mold and the receiving mold are moved in opposite directions by means of the clamping apparatuses, the injection mold frame can be effectively mounted on and removed from the portion to be adhered. Furthermore, the fixing of the jet nozzle to the injection mold enables stable jetting of the adhesive toward this portion.

What is claimed is:

1. A method of bonding parts of a disappearing model used for casting comprising placing a plurality of parts of a foamable synthetic resin for making a disappearing model in adjacent relationship to each other to form an assembly to be bonded together; surrounding said assembly of parts with an injection mold frame which has been previously formed and has an internal shape that accords with the external shape of said assembly of parts to be bonded; said mold having an injection opening formed therein to allow an adhesive to be injected; by means of an injection nozzle injecting through said injection opening an adhesive between said portions to be adhered by means of an apparatus for injecting said adhesive so as to bond together said portions to be adhered; said external surfaces of said assembly being seated against the internal surfaces of said mold in such a manner that the adhesive is entirely confined to the space between the parts whereby the surfaces of the assembled and bonded parts are smooth; and removing said injection mold frame from said portion after bonding.

2. A method of bonding parts of a disappearing model used for casting according to claim 1, wherein said adhesive is a hot melt-type adhesive.

3. An apparatus for bonding parts of a disappearing model for use in casting comprising an injection mold frame having an internal cavity which has an a shape that accords with the external shape of the assembled model parts to be bonded together, said mold frame being formed of a pair of mold portions adapted to be moved in opposite directions with respect to each other to provide access to said internal cavity; an injection hole formed in one of said mold portions to allow an adhesive to be injected into the cavity in said mold frame; and an adhesive injecting apparatus adapted to engage said hole having a jet nozzle for injecting a hot melt-type adhesive into the areas where the assembled model parts abut each other, said mold frame so confining and holding said assembled model parts that the adhesive cannot move outwardly beyond the exterior surfaces of said assembled model parts.

* * * * *

UNITED STATES PATENT AND TRADEMARK OFFICE
CERTIFICATE OF CORRECTION

PATENT NO. : 4,898,635

DATED : February 6, 1990

INVENTOR(S) : Toshiaki Kobari

It is certified that error appears in the above-identified patent and that said Letters Patent is hereby corrected as shown below:

Column 2, line 67:
  After "sectional" insert -- view --.

Column 3, line 31:
  "champing" should be -- clamping --.
Column 3, line 36:
  After "mold" insert -- 2 --.
Column 3, line 42:
  After "these" insert -- are --.
Column 3, line 49:
  "motions." should be -- motion. --.

Signed and Sealed this

Sixth Day of August, 1991

*Attest:*

HARRY F. MANBECK, JR.

*Attesting Officer*         *Commissioner of Patents and Trademarks*

UNITED STATES PATENT AND TRADEMARK OFFICE
CERTIFICATE OF CORRECTION

PATENT NO. : 4,898,635
DATED : February 6, 1990
INVENTOR(S) : Toshiaki Kobari

It is certified that error appears in the above-identified patent and that said Letters Patent is hereby corrected as shown below:

Column 2, line 67:
    After "sectional" insert --view--.
Column 3, line 25:
    Cancel "plurality of disappearing model parts 4, 5".
Column 3, line 31:
    "champing" should be --clamping--.
Column 3, line 42:
    After "these" insert --are--.
Column 3, line 49:
    "motions." should be --motion.--.

This certificate supersedes Certificate of Correction issued August 6, 1991.

Signed and Sealed this

Twenty-first Day of April, 1992

Attest:

HARRY F. MANBECK, JR.

*Attesting Officer*     *Commissioner of Patents and Trademarks*